United States Patent [19]

Dufrenne

[11] Patent Number: 4,564,735
[45] Date of Patent: Jan. 14, 1986

[54] DIRECT CURRENT PULSE WELDER
[75] Inventor: Gerald Dufrenne, LaVerne, Calif.
[73] Assignee: Unitek Corporation, Monrovia, Calif.
[21] Appl. No.: 595,059
[22] Filed: Mar. 30, 1984
[51] Int. Cl.⁴ ............................................. B23K 11/24
[52] U.S. Cl. ................................. 219/110; 219/117.1
[58] Field of Search ............. 219/108, 109, 110, 117.1

[56] References Cited

U.S. PATENT DOCUMENTS 3,441,708 4/1969 Gilbert ................................. 219/110
3,932,725 1/1976 Ganowski ........................... 219/110

FOREIGN PATENT DOCUMENTS 3027315 2/1982 Fed. Rep. of Germany ...... 219/108

404587 4/1974 U.S.S.R. ............................... 219/108

Primary Examiner—Clifford C. Shaw
Attorney, Agent, or Firm—Christie, Parker & Hale

[57] ABSTRACT

A direct current pulse welder including circuitry for controlling the amount of electric energy delivered to the weld site. By means of feedback techniques the output impedance of the welder is adjusted and changed by utilizing a voltage feedback signal and a current feedback signal to match the impedance of the weld site. Matching the impedance of the welder to the impedance of the weld site enables the welder to deliver the correct amount of power desired to each weld regardless of variations in actual impedance of the weld sites that occur in actual production situations.

11 Claims, 3 Drawing Figures

DIRECT CURRENT PULSE WELDER

BACKGROUND OF THE INVENTION

1. Field of the Invention

The present invention relates to resistance spot welders and in particular to precision direct current pulse welders for use in welding electronic circuitry and the like which are capable of delivering a constant amount of energy to each weld site.

2. Description of the Prior Art

In resistance spot welders, it is of prime importance to deliver the same amount of energy to each weld site in order to obtain uniform welds in a production setting. To accomplish this objective, numerous designs for welders and welding power supplies have been developed to deliver a precisely controlled pulse of voltage or current to the weld. This will accomplish the objective of uniform welds, provided each of the weld sites are identical.

In actual production situations, however, wire and the parts to which they are to be welded vary in thickness, surface finish, cleanliness and purity from weld to weld resulting in variations in impedance at each weld site. To further complicate matters, the contact area and pressure exerted by the welding electrodes vary with time during each weld cycle. All of these factors influence the weld schedule, requiring an adjustment in the voltage or current pulse, but in most instances, the instantaneous power is required to remain the same.

Many welders have been designed that allow the instantaneous power to vary, due to the above influences, but compensate for variations in weld site impedance by adjusting the duration of the weld energy pulse proportionately. This will work satisfactorily over a very narrow range of pulse amplitudes. However, half the power for twice the normal duration frequently does not produce a final welding temperture high enough to yield a strong weld, or may produce a metallurgically unacceptable weld.

SUMMARY OF THE INVENTION

The present invention provides a direct current resistance spot welder comprising pulse amplifying means for generating welding energy pulses and electric circuit means interconnecting the output of the amplifying means to welding electrodes of the welder. Voltage feedback means are interconnected between the output and input sides of the amplifying means in a first feedback path and current feedback means are interconnected between the output and input sides of the amplifying means in a second feedback path. A source of power is electrically coupled to the pulse amplifying means and the electric circuit means for delivering energy through the amplifying means to the welding electrodes whereby voltage and current feedback signals from the first and second feedback means are utilized to control the output impedance of the welder and produce an essentially constant voltage-current product at the welding electrodes.

In another aspect, the present invention provides a direct current welding power supply which comprises adjustable control means for determining the amplitude and duration of a weld energy pulse. Amplifiying means are connected to the output of the control means for generating a pulse of the predetermined amplitude and energy. Voltage feedback means are interconnected in a first path between the output side and the input side of the amplifying means in a first feedback path and current feedback means are interconnected in a second path between the output side and the input side of the amplifying means in a second feedback path. A source of power is connected to the amplifying means for transmitting welding energy thereto. The voltage and current feedback signals are combined to cause the output impedance of the power supply to match the impedance of the weld site and thereby transmit the desired amount of energy to each weld.

The present invention operates on the principle of using voltage and current feedback signals to an amplifier to determine its output impedance. A way of measuring the output impedance of an amplifier is to compare the output voltage of the amplifier when no load is connected to the output of the amplifier and thereafter when a load is connected to the output terminals of the amplifier. If the load impedance connected to the amplifier output is chosen so that the output voltage of the amplifier is reduced by half then the output impedance of the amplifier and the impedance of the load are matched and under such conditions the precise amount of power desired is transferred from the amplifier to the load.

In a feedback amplifier the gain of the amplifier is determined by the ratio of the resistance in the feedback path to the input resistance of the amplifier. In the present invention the resistance of the voltage feedback path is selected to be twice the input resistance of the amplifier. A second feedback path is then provided, a current feedback path, which is arranged so that the current in this feedback path is equal to the current in the first feedback path. Under these conditions where the two feedback currents are equal, the output voltage of the amplifier drops to one-half of the output voltage that would be present without a load connected across the output of the amplifier and therefore the output impedance of the amplifier is equal to the load impedance.

In actual circuit design a current sampling resistor is provided which is a variable resistor so as to provide the ability to adjust the output or load resistance until the loaded output voltage is one-half of the unloaded output voltage thereby controlling output impedance and producing the desired impedance matching.

The present invention accomplishes voltage feedback by taking an output voltage signal from the secondary winding of the pulse transformer of the welder and feeding it back to the input of a pulse amplifier in a first feedback path. Current feedback is accomplished by taking a current sample from the transformer primary winding circuit and similarly feeding it back to the input of the pulse amplifier via a second feedback path.

DESCRIPTION OF THE DRAWINGS

The foregoing features of the invention and other specific details of the invention will be better understood by reference to the drawing wherein.

DESCRIPTION OF A SPECIFIC EMBODIMENT

Figure 1:
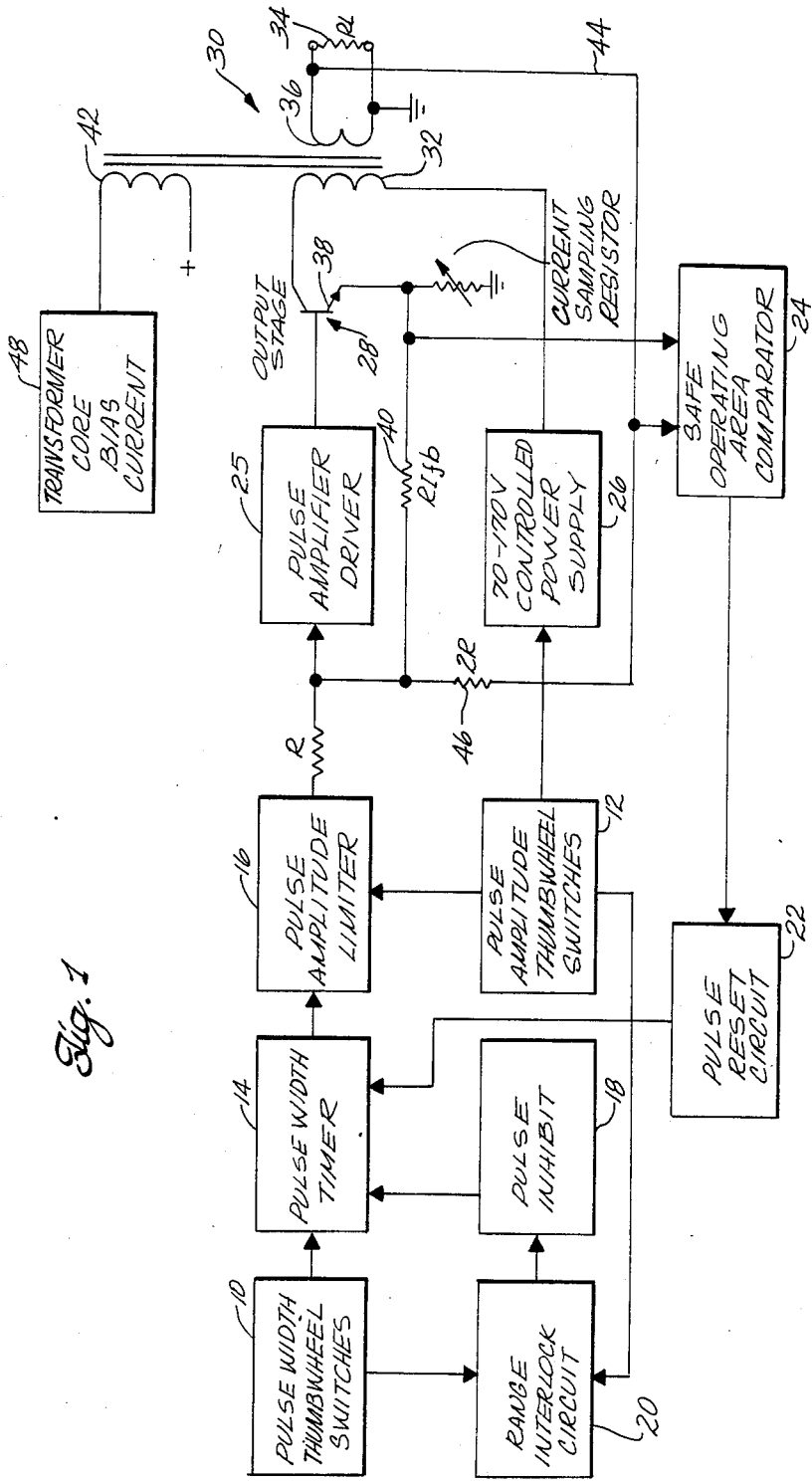
FIG. 1 is a block diagram of the components of the welder according to the present invention.

A block diagram of a resistance spot welder according to the present invention is shown in FIG. 1. In general, the welder can be viewed as comprising two major sections. The first section includes the circuitry which is utilized to preset the amplitude and duration of the welding energy pulse together with the components that keep the pulse within the volt second capabilities of the transformer and the safe operating region of the transistors of the welder. The second section of the welder is the circuitry relating to a pulse amplifier and a pulse transformer portion of the welder which includes an output stage and a feedback network.

As shown in FIG. 1, the first section of the welder includes pulse width (duration) thumbwheel switches 10, pulse amplitude thumbwheel switches 12 and the modules which comprise a pulse width timer 14, a pulse amplitude limiter 16, module 18 for pulse inhibiting, and a range interlock circuit 20. A pulse reset circuit 22 and a safe operating area comparator 24 are also provided. The settings of the thumbwheel switches control the pulse width timer 14 and pulse amplitude limiter 16.

When the welder is activated, an output pulse is generated by pulse amplifier driver 25 in the second section of the welder. The amplitude and duration of the pulse is determined by the welding schedule being used by the operator and thumbwheel settings chosen by him. A typical welder for this type of welding application has a suitable range of pulse amplitudes from 0 to 4 volts and pulse durations from 0 to 80 milliseconds.

In addition to driver 25, the second section of the welder includes a voltage controlled power supply 26 which is connected to primary winding 32 of transformer 30. The output of the driver 25 is also connected through an output stage represented by transistor 28 to primary winding 32. The impedance of the weld site is represented by impedance 34 also designated $R_L$ in FIG. 1. A current feedback path is provided by emitter 38 of output stage transistor 28, and feedback resistor 40, designated $R_{Ifb}$, in FIG. 1 to the input to driver 25. A voltage feedback path is provided by interconnection 44 from secondary winding 36 of pulse transformer 30 through feedback resistor 46, also designated 2R in FIG. 1, to the input of driver 25. A second power supply 48 is provided for generating a bias current which is supplied to winding 42 of transformer 30 and coupled to the transformer to provide a transformer core bias current.

Figure 2:
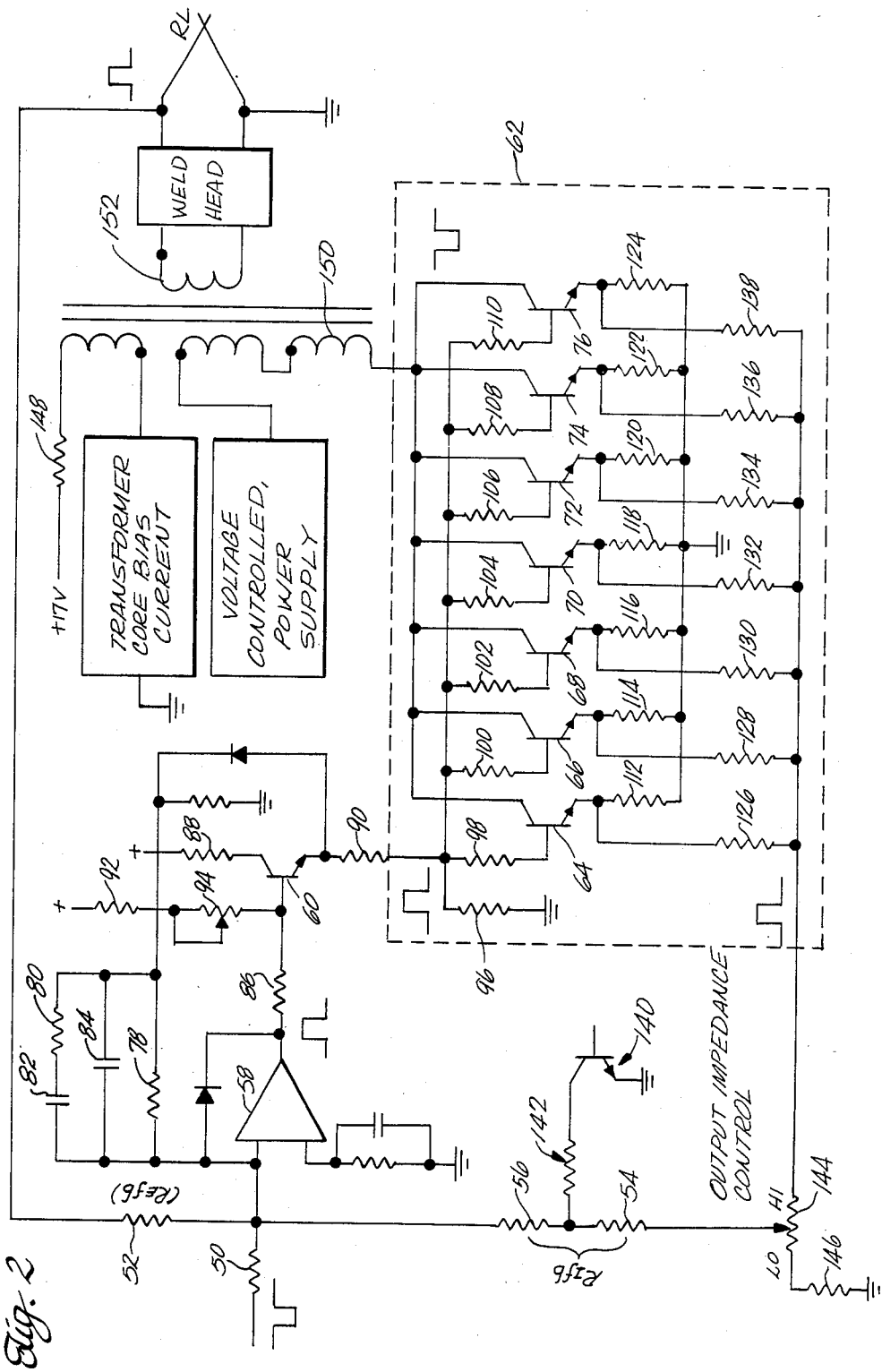
FIG. 2 is a schematic diagram of a portion of the welder circuitry illustrating the feedback paths which enable accomplishment of the objective of impedance matching between the output of the welder and impedance at the weld site.

The schematic in FIG. 2 is limited to a schematic diagram of the second section of the welder shown in FIG. 1.

In FIG. 2, resistor 50 is an input resistor to the amplifier, and resistor 52 is the voltage feedback resistor, $R_{Efb}$. The current feedback resistor ($R_{Ifb}$) is the combination of resistors 54 and 56. Resistor 52 is chosen to have twice the value of resistor 50 in order that amplifier 58 be provided with a gain of two.

Amplifier 58 and transistor 60 provide the voltage and current gain necessary to drive the output stage 62 which comprises transistors 64, 66, 68, 70, 72, 74, 76.

Resistors 78 determines the loop gain and the combination of resistor 80 and capacitors 82, 84 provide for feedback loop stability. Resistors 86, 88, 90 limit the current and power dissipation in transistor 60. Resistors 92 and 94 provide the proper initial bias for transistor 60. Resistor 96 provides a path for collector to base leakage currents for transistors 64 through 76.

Resistors 98, 100, 102, 104, 106, 108 and 110 help transistors 64 to 76 to share current. Resistors 112, 114, 116, 118, 120, 122 and 124 also help transistors 64 to 76 to share current and are simultaneously used to monitor the transformer primary winding current by means of averaging resistors 126, 128, 130, 132, 134, 136 and 138. This current is directly related to the current in the secondary winding by the transformer ratio and must be scaled by that factor. In the presently preferred embodiment of the welder the primary windings are connected in series in the 0 to 1.99 volt range of pulse voltages. In the 2.0 to 4.0 range, the primary windings are switched from series to parallel connection. When the primary windings are switched to a parallel connection, the current feedback must also be changed by a factor of two. This is accomplished by means of transistor 140 and resistor 142 in conjunction with feedback resistors 54 and 56. Potentiometer 144 and resistor 146 provide adjustable attenuation of the current feedback signal and function as the current sampling resistor of FIG. 1 to enable the selection of the proper value of the load impedance $R_L$ (the weld interface resistance) to provide the required value of current in the current feedback path to balance the loop. Resistor 148 limits the dissipation in the core bias circuit.

To prevent the transistor from being driven beyond safe ranges of transistor operation, the power supply that supplies the output stage is programmed by the pulse amplitude selected as is shown by the interconnection from thumbwheel switches 12 to power supply 26 in FIG. 1.

The present invention proceeds from the usual principle employed in measuring the output impedance of an amplifier. A common method of making this measurement is to connect a resistance across the output of an amplifier while monitoring the output voltage from the amplifier. By adjusting the resistance connected across the output of the amplifier until the voltage output drops to one-half of original unloaded value, the output impedance and the load impedance are equal and operation of the welder at the apex of the maximum power transfer curve (See FIG. 3) is obtained.

The relationship is used in the present invention by providing a voltage feedback signal in a first path between the input and output of a pulse driver amplifier and a current feedback signal through a second path from the output to the input of the pulse driver amplifier. It has been found that by proper design and control of the two feedback paths the output impedance of the amplifier can be controlled and can be caused to match the impedance of the load, that is the impedance at the weld location. By thus matching these impedances, a maximum power transfer from the welder to the weld location is obtained. This means that for any given weld energy setting of the welder, essentially all of the preset amount of power will be delivered to the weld location at each and every weld.

Control of the feedback paths and of the output impedance of the welder is obtained in the following manner. In the ideal feedback amplifier the output voltage from the amplifier only changes until the current in the feedback path equals the input current. Once the two currents are the same, the output stabilizes and remains at that value. In other words, the total feedback current flowing in one direction relative to the feedback amplifier;3 s summing junction (i.e., the junction of resistors 50, 52, 56, etc.) is substantially equal to the input current flowing in the opposite direction relative to the summing junction. Since the currents are equal the voltage drops across the input impedance and the feedback impedance are proportional and the gain of the amplifier can be determined by the ratio of the input impedance to the impedance in the feedback path. If the impedance in the feedback path is chosen to be twice as large as the input impedance, the amplifier has a gain of two.

The invention next provides a second feedback path from the load impedance which is arranged such that the feedback voltage in the second path is proportional to the current in the load impedance, that is, proportional to the impedance of the weld location. If the load impedance is now adjusted to produce a feedback current that is equal to the feedback current in the first path, the feedback loop can only be balanced, since the amplifier has a gain of two, if the output voltage of the amplifier is reduced to one-half of its value prior to the second feedback path being connected into the circuit.

A current sampling resistor (also labeled "output impedance control" in FIG. 2) which is very small in comparison to the value of the load impedance $R_L$ is connected in the second feedback path and if this resistance is made to be potentiometer or rheostat, control over the value of the output impedance is obtained. By adjusting the potentiometer and thus the value of the output impedance to balance the feedback currents and make them equal, the output of the amplifier is reduced by half. When this occurs the output impedance is equal to the load impedance and the desired impedance match is thereby obtained.

Figure 3:
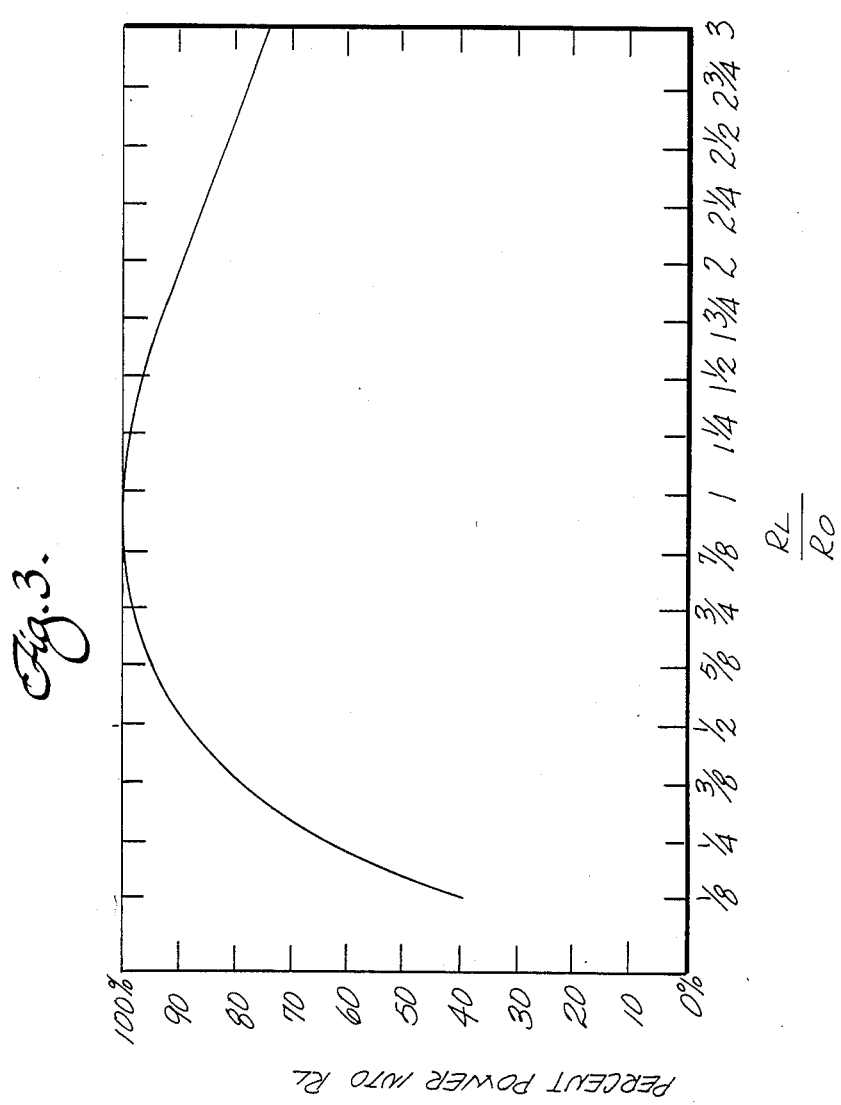
FIG. 3 is a graph depicting the percent of total power available that is actually delivered to a load impedance such as a weld site as a function of the ratio of the load impedance to the output impedance of the welder.

As the graph in FIG. 3 illustrates, maximum power transfer occurs when the load impedance is equal to the output impedance of the amplifier, that is, the ratio of impedances is one. The graph in FIG. 3 plots the percentage of power transferred into the load as a function of the ratio of the load impedance to the output impedance. When the load impedance is smaller than the output impedance, such as one quarter of the output impedance, approximately sixty percent of the output power from the welder is transmitted to the load. When the ratio is between $\frac{7}{8}$ and $1\frac{1}{4}$, essentially one hundred percent of the power output is transmitted to the load. The impedance match described herein causes the welder of the present invention to operate at the apex of the power transfer curve in FIG. 3. This means that even in the event where there are small variations in the load impedance from weld to weld, essentially constant energy transfer to the weld site is accomplished because the power transfer curve is essentially flat over a range of impedance ratios bracketing the ratio of $R_L R_O = 1$. In many welding situations involving unusual combinations of materials and unusual configurations, it is important that repeatable and constant amounts of energy be transferred to the weld location. By establishing the output impedance of the welder to match the nominal impedance of the load, it has ben found that the desired amount of constant energy is transferred regardless of weld to weld variations and that consistent repeatable welds are obtained each and every time.

In short, the invention utilizes an amplifier and feedback techniques to obtain adjustability of the output impedance of the amplifier. This adjustability is obtained by reducing the voltage feedback by a factor of two to double the amplifier's voltage gain and then reducing the overall gain of the amplifier to one with sampled weld current. The same principle is applicable in other applications such as phase controlled AC welders.

What is claimed is:

1. A direct current resistance spot welder comprising:
    pulse amplifying means having an input and an output side for generating a welding energy pulse;
    electric circuit means interconnecting the output side of the amplifying means to welding electrodes of the welder;
    voltage feedback means interconnected between the output and input sides of the amplifying means in a first feedback path to supply a voltage feedback signal to the input side;
    current feedback means interconnected between the output and input sides of the amplifying means in a second feedback path to supply a current feedpack signal to the input side; and
    a source of power electrically coupled to the pulse amplifying means and the electric circuit means for delivering energy through the amplifying means to the welding electrodes whereby the voltage and current feedback signals from the feedback means are summed to control the output impedance of the welder and produce an essentially constant voltage-current product at the welding electrodes.

2. A welder according to claim 1 including control means for selecting the amplitude and duration of a welding energy pulse from the welder electrically coupled to the pulse amplifying means.

3. A welder according to claim 2 wherein the current feedback means includes an adjustable resistor whereby the output voltage from the amplifier is controlled so as to cause the output impedance of the welder to be essentially equal to the impedance at the weld site.

4. A welder according to claim 2 wherein the circuit means is a pulse transformer having a primary winding electrically coupled to the output of the amplifyng means and a secondary winding electrically coupled to the welding electrodes.

5. A welder according to claim 4 wherein the voltage feedback path is connected from the secondary winding of the transformer through a feedback resistor to the input to the amplifying means.

6. A welder according to claim 5 wherein the control means are coupled to the input to the amplifying means through an input resistance.

7. A welder according to claim 6 wherein the feedback resistance has a resistance value which is twice the resistance value of the input resistor whereby the amplifying means is provided with a voltage gain of two.

8. A welder according to claim 7 wherein the current feedback path is responsive to current flow through the primary winding of the transformer, and includes a feedback resistor connected to the input to the amplifying means.

9. A welder according to claim 8 wherein an adjustable resistor is connected in series circuit relationship with the feedback resistor in the current feedback path.

10. A welder according to claim 9 wherein the adjustable resistor is a potentiometer.

11. A direct current welding power supply comprising:
    welding electrodes for delivering a predetermined welding energy pulse at a weld site;
    control means for adjusting the amplitude and duration of the welding energy pulse;

amplifying means having a summing junction and an output;
means for connecting the control means to the summing junction;
voltage feedback means connected in a first feedback path to the summing junction to provide a voltage feedback signal representative of the voltage developed across the welding electrodes;
current feedback means connected in a second feedback path to the summing junction to provide a current feedback signal representative of the current flowing through the welding electrodes; and
a source of power electrically coupled to the amplifying means for delivering energy to the amplifying means and to the weld site whereby the voltage and current feedback signals cause the welding energy pulse to have an essentially constant voltage-current product at the weld site.

* * * * *